US011829455B2

(12) United States Patent
Bhide et al.

(10) Patent No.: US 11,829,455 B2
(45) Date of Patent: *Nov. 28, 2023

(54) AI GOVERNANCE USING TAMPER PROOF MODEL METRICS

(71) Applicant: International Business Machines Corporation, Armonk, NY (US)

(72) Inventors: Manish Anand Bhide, Hyderabad (IN); Ravi Chandra Chamarthy, Hyderabad (IN); Arunkumar Kalpathi Suryanarayanan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,506

(22) Filed: Mar. 20, 2023

(65) Prior Publication Data

US 2023/0229744 A1 Jul. 20, 2023

Related U.S. Application Data

(63) Continuation of application No. 17/092,340, filed on Nov. 9, 2020, now Pat. No. 11,636,185.

(51) Int. Cl.
*G06F 21/14* (2013.01)
*G06F 9/54* (2006.01)

(52) U.S. Cl.
CPC ............... *G06F 21/14* (2013.01); *G06F 9/547* (2013.01)

(58) Field of Classification Search
CPC ............................ G06F 21/143; G06F 9/547
USPC ........................................................ 713/189
See application file for complete search history.

(56) References Cited

U.S. PATENT DOCUMENTS

| 8,214,308 | B2 | 7/2012 | Chu | |
|---|---|---|---|---|
| 2015/0193697 | A1* | 7/2015 | Vasseur | G06N 3/02 |
| | | | | 706/12 |
| 2016/0306827 | A1 | 10/2016 | Dos Santos | |
| 2017/0316391 | A1* | 11/2017 | Peikert | G06Q 20/1235 |
| 2018/0082239 | A1* | 3/2018 | Baloch | G06Q 10/06395 |
| 2019/0087469 | A1* | 3/2019 | Zhang | G06F 16/2465 |
| 2019/0147371 | A1* | 5/2019 | Deo | G06N 20/20 |
| | | | | 706/12 |
| 2020/0004857 | A1 | 1/2020 | Kumar Sethy | |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

(Continued)

*Primary Examiner* — Michael S McNally
(74) *Attorney, Agent, or Firm* — Mark Bergner

(57) ABSTRACT

One example of a system comprises using a processor for identifying a model to be validated that is stored in a repository; automatically computing and recording one or more model metrics for the model to be validated in a tamper-proof manner; comparing the computed tamper-proof metrics with one or more encoded rules and policies to determine if the model to be validated complies with the one or more encoded rules and policies; and outputting a notification to a device indicating a validation status of the model to be validated based on the comparison of the computed tamper-proof metrics with the one or more encoded rules and policies.

19 Claims, 5 Drawing Sheets

(56) References Cited

U.S. PATENT DOCUMENTS

2020/0090063 A1* 3/2020 Reynolds .......... G06Q 10/0637
2022/0147597 A1 5/2022 Bhide

OTHER PUBLICATIONS

Siddiqi, "Model Governance for AI: Rethinking Our Approach to Validating and Using Black Box Models," SAS Global Forum 2020, Paper SAS4290-2020, 2020, 5 pages. <https://www.sas.com/content/dam/SAS/support/en/sas-global-forum-proceedings/2020/4290-2020.pdf>.

IBM, "List of IBM Patents or Patent Applications Treated as Related", Appendix P, filed herewith, 2 pages.

\* cited by examiner

AI GOVERNANCE USING TAMPER PROOF MODEL METRICS

BACKGROUND

In regulated industries such as banking and insurance, any kind of model needs to undergo proper validation before it can be deployed to production. Typically, there are model validators who perform the validation of the models and approve or reject them. Data scientists spend a lot of time building the model—which is in the order of months. One problem that enterprises have is that often data scientists build a model without worrying about governance rules and policies. Hence, when the model validator validates the model, the model is rejected and then the data scientists have to go back to start over to fix the model. This delays the deployment of models to production.

SUMMARY

Aspects of the disclosure may include a computer-implemented method, computer program product, and system. One example of the method comprises identifying a model to be validated that is stored in a repository; automatically computing and recording one or more model metrics for the model to be validated in a tamper-proof manner; comparing the computed tamper-proof metrics with one or more encoded rules and policies to determine if the model to be validated complies with the one or more encoded rules and policies; and outputting a notification to a device indicating a validation status of the model to be validated based on the comparison of the computed tamper-proof metrics with the one or more encoded rules and policies.

The above summary is not intended to describe each illustrated embodiment or every implementation of the present disclosure.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
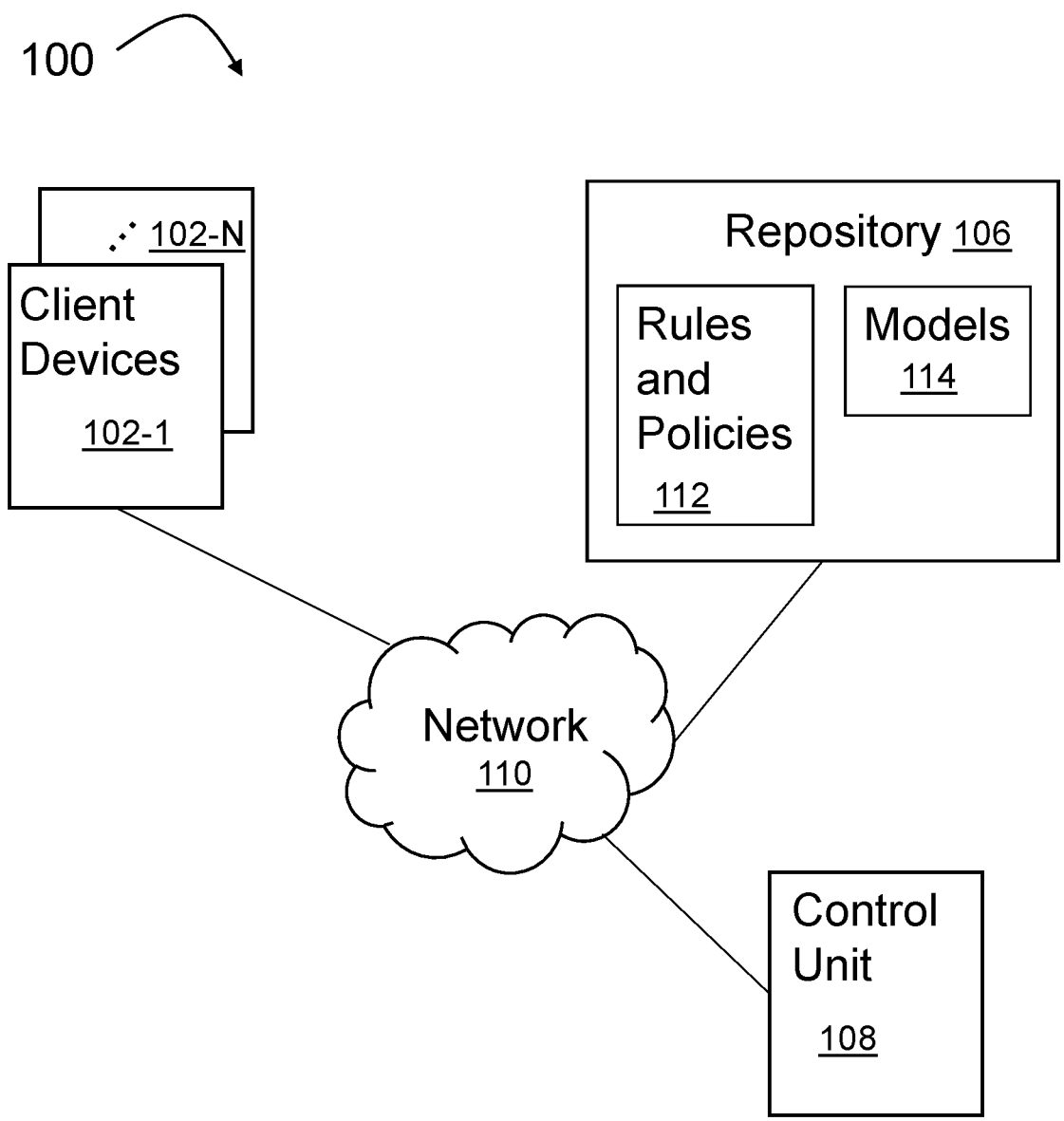
FIG. 1 is a high-level block diagram of one embodiment of an example system AI governance system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, "a number of" when used with reference items, means one or more items. For example, "a number of different types of networks" is one or more different types of networks.

Further, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. In other words, "at least one of", "one or more of", and "and/or" mean any combination of items and number of items may be used from the list, but not all of the items in the list are required. The item may be a particular object, a thing, or a category. Additionally, the amount or number of each item in a combination of the listed items need not be the same. For example, in some illustrative examples, "at least one of A, B, and C" may be, for example, without limitation, two of item A; one of item B; and ten of item C; or 0 of item A; four of item B and seven of item C; or other suitable combinations.

Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Furthermore, the term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

In the present disclosure, a system and method are proposed to reduce the likelihood of models getting rejected by human validators which delays the model development lifecycle. In particular, a mechanism is proposed to validate the model automatically against artificial intelligence (AI) governance rules and policies in order to provide an advance warning of the model metrics which need to be fixed so that the model can pass the model validation process. The embodiments described herein include various features such as encoding of AI governance rules and policies in a policy engine; tamper proof capturing of model metrics during the model development lifecycle along with lineage; and automated validation of the AI Governance policies and rules when a model is saved in a model repository.

FIG. 1 is a high-level block diagram of one embodiment of an example AI governance system 100. The system 100 includes one or more client devices 102-1 ... 102-N (herein referred to collectively as client devices 102), a repository 106, and a control unit 108 (also referred to herein as AI validator 108) coupled together via a network 110. The network 110 can be implemented using any number of any suitable physical and/or logical communications topologies. The network 110 may include one or more private or public computing networks. For example, network 110 may comprise a private network. Alternatively, or additionally, network 110 may comprise a public network, such as the Internet. Thus, network 110 may form part of a packet-based network, such as a local area network, a wide-area network, and/or a global network such as the Internet. Network 110 can include one or more servers, networks, or databases, and can use one or more communication protocols to transfer data between the repository 106, the control unit 108, and the client devices 102.

Furthermore, although illustrated in FIG. 1 as a single entity, in other examples network 110 may comprise a plurality of networks, such as a combination of public and/or private networks. The communications network 110 can include a variety of types of physical communication channels or "links." The links can be wired, wireless, optical, and/or any other suitable media. In addition, the communications network 110 can include a variety of network hardware and software for performing routing, switching, and other functions, such as routers, switches, base stations, bridges or any other equipment that may be useful to facilitate communicating data. Furthermore, it is to be understood that different devices in the system 100 can utilize different networks. For example, in some embodiments, some client devices 102 can be communicatively coupled to the control unit 108 via a cellular network while the repository 106 and/or other client devices 102 are communicatively coupled to the control unit 108 via a private wide area network or the internet.

Additionally, it is to be understood that although control unit 108 is depicted as a separate device communicatively coupled to the client devices 102 and repository 106 via the network 110, the control unit 108 can be implemented differently in other embodiments. For example, in some embodiments, the control unit 108 is implemented as part of the client devices 102. That is, the control unit 108 can be implemented using computing resources of the client devices 102, such as processing unit, memory, etc. In other embodiments, some functions described herein as being performed by the control unit 108 can be performed in one or more of the client devices 102 while other functions are performed by a separate device communicatively coupled to the client devices 102. Thus, the functionality described herein as being performed by the control unit 108 can be distributed across two or more devices to enable the functionality of the control unit 108 discussed herein. That is, one or more processors, interfaces, memories, etc. in each of two or more devices can be configured to implement the functionality of the control unit 108. For example, in some embodiments, one or more processes/agents can be executed on each client device 102 to capture content to be analyzed which is then communicated to the control unit 108 for further analysis. Thus, it is to be understood that the control unit 108 can be implemented differently in various embodiments.

Each of the client devices 102 can be implemented as a mobile device (such as, but not limited to, a smart phone, tablet, wearable device, augmented reality (AR)/virtual reality (VR) device, etc.), desktop computer, or laptop computer, etc. In addition, although repository 106 is depicted in FIG. 1 as a single device storing both rules and policies 112 as well as models 114, it is to be understood that repository 106 can be implemented differently in other embodiments. For example, in some embodiments, the repository stores only the models 114, whereas the rules and policies 112 are stored in the control unit 108. Additionally, the repository 106 and/or control unit 108 can be implemented within a cloud computer system or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers.

The control unit 108 is configured to implement an AI governance policy engine. For example, the control unit 108 can be configured to implement machine learning techniques to evaluate a model against the rules and policies 112 which are encoded into the AI governance policy engine. Example machine learning techniques can include can comprise algorithms or models that are generated by performing supervised, unsupervised, or semi-supervised training on a dataset. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The AI governance policy engine enables a user, such as the Chief Risk Officer of an organization, to define a set of AI Governance rules and policies that are to be enforced in the organization. Typically, these are the same rules which are validated by human model validators. Some sample rules can include, but are not limited to, a rule that an AI model should only be built using governed data. As used herein, governed data is data that has been through cleansing process and complies with a selected quality standard. In other words, governed data is data that has undergone specified quality checks. Governed data can be stored in governed catalogs such that data used from the governed catalogs is ensured to have gone through the specified quality checks. Non-governed data is typically easily accessible. For example, a data scientist can make use of data which is easily available on their laptop or a common machine. However, such data is not necessarily governed data and, thus, poses quality concerns. Hence, in some embodiments, the system described herein ensures that models are built only using governed data which is available in a governed catalog and has undergone proper data quality checks.

Other example rules include a rule that an AI model should have fairness metric above a given threshold, e.g. 80%, and a rule that an AI model should have a quality metric above a given threshold, e.g. 90%. Other rules can be related to explainability, data drift, etc. Rules for validating models are known to one of skill in the art and not explained in more detail herein. The set of rules to be applied can be selected or created by a user, such as Chief Risk Officer, and can vary in different embodiments depending on the purpose for which the models are being built. The set of rules are encoded in the AI governance policy engine implemented by the control unit 108 such that the AI governance policy engine is able to validate a model against these rules. For example, the AI governance policy engine can check if the model was built using governed data or not. One example technique for performing this check on governed data can be performed by comparing a list of approved governed data catalogs to metadata information on the data used in the model that is captured when the model is built. For example, a data scientist cam specify the training data used to build the model. This can be a data asset which is present in the project in which the model is being built. Thus, model development tools maintain a concept of projects which contain all the artefacts which are used to build the model. Data assets in the project can be copied from a governed catalog. The AI governance policy engine checks that the data asset used to build the model has been copied from a governed catalog.

In addition, the control unit 108 is configured, in some embodiments, to automatically evaluate a model against the set of rules in response to detecting that the model has been stored in the repository 106. After building a model, a data scientist typically uploads the model to a repository, such as repository 106. The control unit 108 can be configured, in some embodiments, to periodically check for models uploaded to the repository since a last check and to analyze any newly discovered models against the rules and policies 112. In other embodiments, uploading a model to the repository 106 can automatically trigger a command sent to the control unit 108 to analyze the newly uploaded model against the rules and policies 112. If the AI governance policy engine detects any rule or policy violations, a notification is sent to one or more of the client devices 102 to notify the user of the violation. In this way, the user can correct or update the model to comply with the rules. This reduces the likelihood that the model will be rejected when a human validator reviews the model, thus saving time in the model development cycle.

Furthermore, the embodiments described herein ensure that the model is evaluated, and the model metrics are computed, in a tamper proof manner. If a user is allowed to compute and directly update the metrics, it is possible to set a value such that the model will pass the automated validation checks, e.g., accuracy to 99% and fairness to 95%, without actually having done any computation. Hence, there is a need for a system which will compute these metrics and directly update it in a repository where it is not manually editable by users. Only authorized tools are able to update this information and this information is used by the AI governance policy engine to validate the model complies with the AI governance rules and policies.

For example, in some embodiments, the repository 106 is a data catalog, such as, but not limited to IBM® Watson Knowledge Catalog, which can capture model metadata. One or more parts of the model metadata are defined by the repository 106 as non-editable by end users. Rather, this metadata is defined as only editable by in-built model metrics computation tools. One example of such a model metrics computation tool that includes, but is not limited to, a system such as OpenScale. For example, a field in the model metadata can be included to identify which elements can only be edited by a particular tool. The field can include the service identification (ID) associated with a computation tool authorized to make the edits. The service IDs can be registered with the repository 106 and only service IDs registered with the repository 106 can make edits to the metadata defined as being non-editable by end users. The computation tool is configured to compute these metrics and use a unique service ID registered with the repository 106 to update the model metrics in the model asset stored in the data catalog. In operation, once a model is built, it is saved to the repository 106 and a computation tool calculates metrics to validate the model. After computing the metrics, the computation tool can update metadata indicating values for the computed metrics. The AI governance policy engine can then verify if the computed metrics comply with the set of rules corresponding to model metrics. In this way, an end user is not able to erroneously enter inaccurate metric data. Thus, the system 100 is able to compute more accurate metrics and, consequently, more accurately determine if the model complies with the defined rules and policies 112.

In addition to the model metrics, system 100 can utilize other model attributes in the AI governance policy engine to analyze a model. One such example is the training data used to build the model. A data scientist could make use of non-governed data to build and train the model, but the model could be erroneously labelled as having been built using governed data. In order to avoid such scenarios, in some embodiments, the AI governance policy engine first checks if there is a policy that states that the model should only be built using governed data when the AI governance policy engine is asked to validate the model. If there is such a policy, the AI governance model checks if the training data pointed to by the label applied to the model is actually from a governed catalog. If yes, the AI governance policy engine reads the data pointed by the model being validated and causes a new challenger model to be built with the data. For example, the challenger model can be built using various systems such as, but not limited to, AutoAI in IBM Watson® Studio. Such systems attempt to find the best model that can be built using the training data. Metrics are then computed for the built challenger model. The AI governance policy engine then compares the model metrics for the challenger model with computed model metrics for the model being validated. In some such embodiments, the AI governance policy engine determines that the model being validated was built using non-governed data if the metrics for the model being validated are worse than the metrics of the challenger model. This decision is based on the assumption that if the model being validated were built using non-governed data then the typical problem with that data is that it has bad quality as it has not undergone proper data quality checks. Hence the quality of a model built using such data will typically be poor. Thus, if the quality of the model being validated is better than the one built using an AI system, it is assumed that the model was built using the data pointed to by the label applied to the model.

At periodic intervals, the model repository 106 checks with the AI governance policy engine implemented by the control unit 108 to determine if the model in the repository conforms to the AI governance rules and policies. For example, the repository 106 can make a call to the AI governance policy engine and send metadata about the model to the AI governance policy engine. As discussed above, in some embodiments, the metadata is tamper proof and updated only by authorized systems having a registered service ID. The AI governance policy engine checks if the model metrics conform to the policies and rules. If they do, then the model is flagged as one that passes the governance checks. If, on the other hand, the model does not pass the governance checks, then the AI governance policy engine flags the model as having failed the validation. The AI governance policy engine can automatically output a notification to a corresponding client device associated with the model (e.g. a client device of the listed data scientist for the model) regarding the validation status of the model.

Additionally, the periodic checks enable the AI governance policy engine to detect a change in the policies or rules and update the validation status of the model. For example, when a model is pushed to the repository 106, the AI governance policy engine validates the model against the rules and policies 112. The model may be found to comply with the rules and policies 112 at the time it is pushed to the repository 106. However, subsequent to being analyzed by the AI governance policy engine, the rules or policies can be changed by a user, such as the Chief Risk Officer. Due to the change in rules or policies, the model is no longer compliant. By performing periodic checks, in some embodiments, the AI governance policy engine is able to detect the change in validation status of the model and send a notification to the user or data scientist that pushed the model to the repository 106 regarding the change. Additionally, in some embodiments, the AI governance policy engine is configured to detect changes to the rules and policies 112 and, in response to such detected changes, automatically initiate a review of models that have been previous evaluated by the AI governance policy engine. Through these automated validation checks, the system 100 helps ensure that the data scientist has a chance to fix the model earlier in the development cycle rather than waiting for a human model validator to validate the model before being notified of elements to be fixed. Thus, the delay in the development cycle of the model can be reduced.

In addition to the above, the AI governance policy engine also provides an application programming interface (API) using which enables a user to check on demand if the model meets the governance policies or if the model needs to be improved so that it passes the validation check. Hence, the quality of models that are built is improved and problems/issues in models related to violation of governance policies will be known early in the lifecycle, thereby, reducing the time it will take to deploy models to production.

Figure 2:
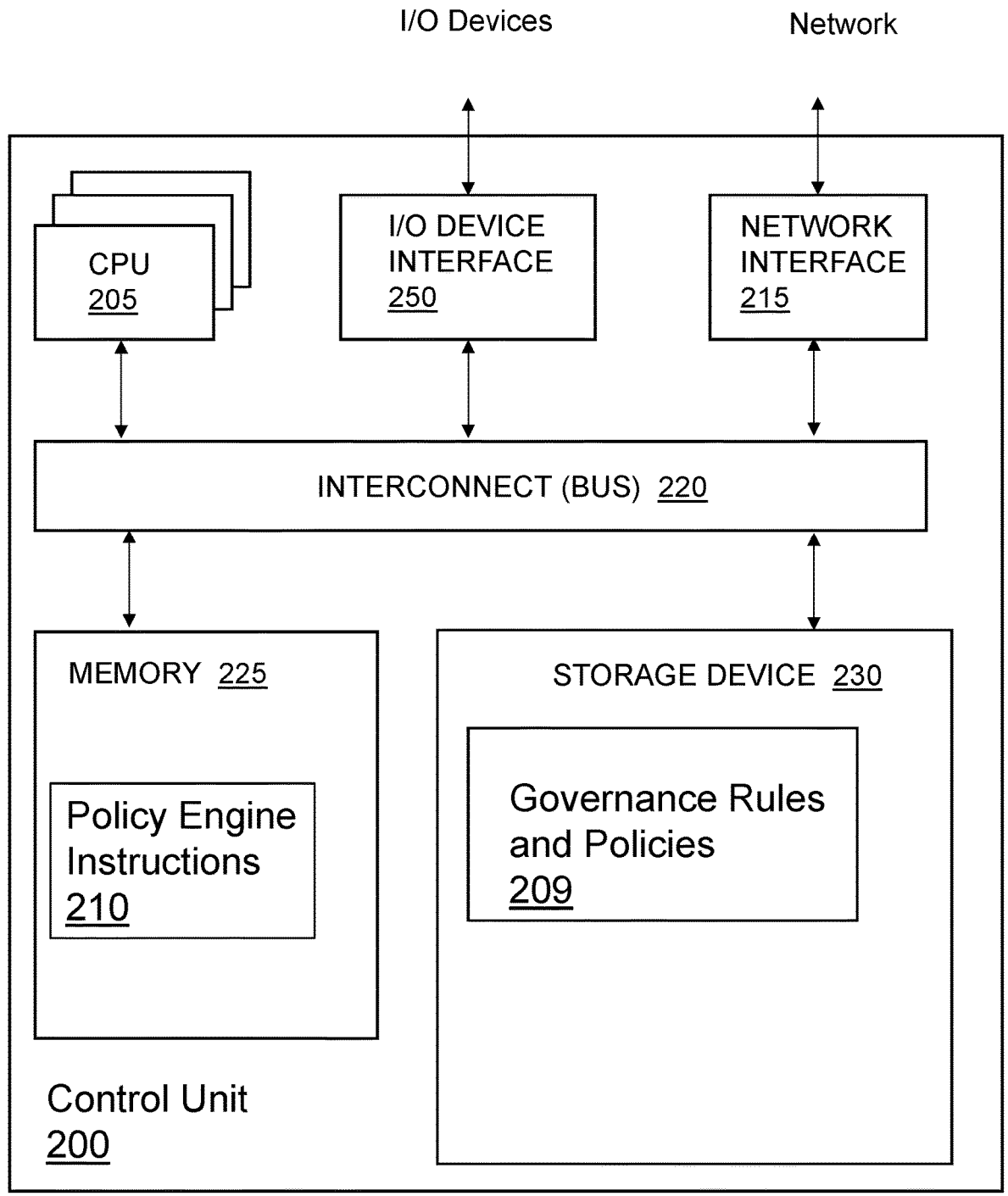
FIG. 2 is a block diagram depicting one embodiment of an example AI validator.

FIG. 2 is a high-level block diagram of one embodiment of an example control unit 200 configured to implement an AI governance policy engine. In the example shown in FIG. 2, the control unit 200 includes a memory 225, storage 230, an interconnect (e.g., BUS) 220, one or more processors 205 (also referred to as CPU 205 herein), an Input/Output (I/O) device interface 250, and a network interface 215. It is to be understood that the control unit 200 is provided by way of example only and that the control unit 200 can be implemented differently in other embodiments. For example, in other embodiments, some of the components shown in FIG. 2 can be omitted and/or other components can be included.

Each CPU 205 retrieves and executes programming instructions stored in the memory 225 and/or storage 230. The interconnect 220 is used to move data, such as programming instructions, between the CPU 205, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the control unit 200 via a communication network coupled to the network interface 215.

In some embodiments, the memory 225 stores policy engine instructions 210 and the storage 230 stores governance rules and policies data 209. This governance rules and policies data 209 can include rules such as discussed above. In other embodiments, the instructions 210 and the governance rules and policies data 209 are stored partially in memory 225 and partially in storage 230, or they are stored entirely in memory 225 or entirely in storage 230, or they are accessed over a network via the network interface 215. Additionally, as discussed above, the governance rules and policies data 209 can be stored in a database or memory device accessed via the network interface 215, such as repository 106, rather than being locally attached or integrated with the control unit 200.

When executed, the instructions 210 cause the CPU 205 to analyze models, such as models 114 received over the network interface 215, to perform the functionality discussed above. Additionally, the control unit 200 can receive user instructions requesting validation of a specified model via either the network interface 215 or the I/O device interface 250. The instructions 210 further cause the CPU 205 to output signals and commands to a device via network interface 215 and/or I/O device interface 250 to indicate if the model complies with the governance rules and policies.

Figure 3:
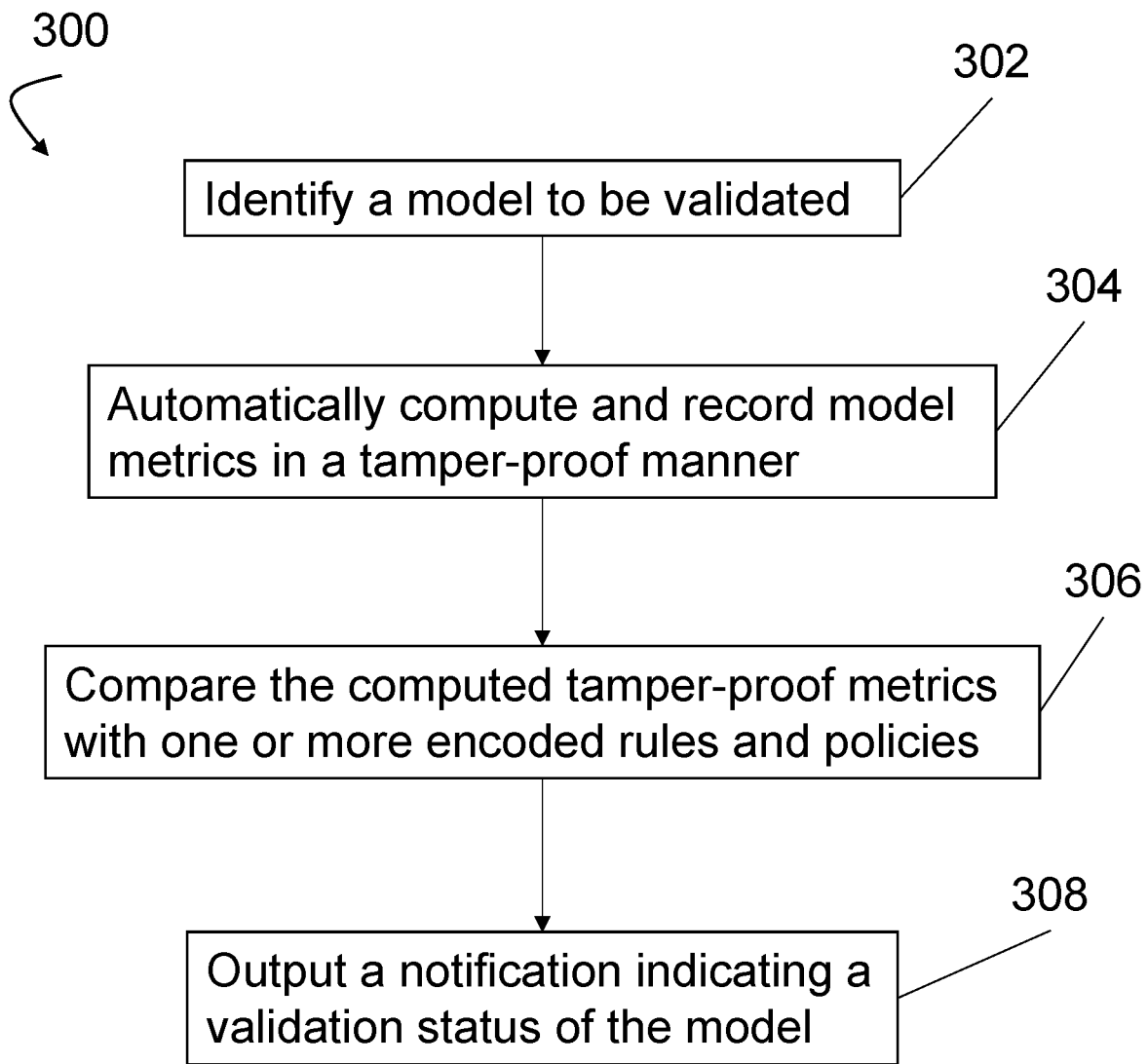
FIG. 3 is a flow chart depicting one embodiment of an example method of enforcing governance policy using tamper proof model metrics.

FIG. 3 depicts one embodiment of an example method 300 of enforcing governance policy using tamper proof model metrics. The method 300 can be implemented by a control unit, such as control unit 108. For example, the method 300 can be implemented by a CPU, such as CPU 205 in control unit 200, executing instructions, such as policy engine instructions 210. It is to be understood that the order of actions in example method 300 is provided for purposes of explanation and that the method can be performed in a different order in other embodiments. Similarly, it is to be understood that some actions can be omitted or additional actions can be included in other embodiments.

At 302, a model stored in a repository, such as repository 106, is identified as a model to be validated. For example, in some embodiments, a model to be validated is identified based on user instructions received via an application programming interface (API). The user instructions can include a command or request to initiate validation and specify the model to be validated. In other embodiments, identifying the model to be validated can include detecting that a model has been pushed to the repository. Thus, in such embodiments, the validation is initiated automatically in response to detecting that the model has been pushed to the repository. In other embodiments, identifying the model is part of a periodic validation check. For example, the control unit 108 can periodically perform recurring validation checks on models stored in the repository 106 according to a schedule. In this way, changes to rules and/or policies after an initial validation check can be captured and used to re-evaluate the models stored in the repository 106. In some embodiments, the control unit 108 is configured to detect changes to an encoded rule and/or policy and, in response to detecting such a change, the control unit 108 is configured to identify models stored in the repositor 106 which have not been evaluated since the detection of the change. Those models which have not been evaluated after the detected change, are then identified as models to be validated.

At 304, one or more model metrics for the model to be validated are automatically computed and recorded in a tamper-proof manner, as discussed above. For example, in some embodiments, a service ID of a computation tool authorized to edit metadata of the model is registered with the repository. The control unit 108 and/or the repository 106 then prevents or prohibits edits to the metadata of the model by end users and any tool without a service ID registered with the repository as an authorized tool. In this way, the model metrics can be computed only by authorized tools and those metrics can only be stored or edited by the authorized tools. This enables the metrics to be computed in a tamper-proof manner which increases the accuracy of computations in determining compliance of a model with the rules and policies.

At 306, the computed tamper-proof metrics are compared by the control unit 108 with one or more encoded rules and policies to determine if the model to be validated complies with the one or more encoded rules and policies. As discussed above, since the model metrics are computed automatically and in a tamper-proof manner, the control unit 108 is able to more accurately determine whether the model complies with the rules and policies since the model metrics are not subject to human error or unauthorized editing. Additionally, in some embodiments, comparing the tamper-proof metrics also includes verifying metadata entered by a human user and comparing the verified metadata to one or more rules/policies. For example, as described above, a user can specify which training data was used to build the model. However, the data specified by the user could be erroneously specified. Since some rules include only using training data from approved governed data sources, the control unit 108 can verify that that the specified training data is the data actually used in building the model.

For example, in some embodiments, to verify the training data used, the control unit 108 retrieves the training data specified or identified in a label or metadata associated with the model being validated. The control unit 108 then automatically builds a sample model using the retrieved training data. For example, the control unit 108 can utilize tools such as AutoAI in IBM Watson® Studio to build the sample model. However, it is to be understood that other tools for automatically building the sample model can be used in other embodiments. The control unit 108 then computes one or more metrics for the sample model and compares the one or more metrics for the sample model with the one or more metrics for the model to be validated. Based on the comparison of the metrics, the control unit 108 is able to verify whether the model to be validated was built using the identified training data. For example, as discussed above, if the metrics for the sample model are better or comply more with the rules and policies than the metrics for the model to be validated, then the control unit 108 can determine that the model to be validated was not built using the training data.

At 308, a notification is output to a device indicating a validation status of the model to be validated based on the comparison of the computed tamper-proof metrics with the one or more encoded rules and policies. For example, this notification can be in response to an on-demand request for validation, such as through the API, in response to a periodic validation check, in response to a detected change in the rules/policies and/or in response to an initial validation check. The notification can include a high-level status such as whether the model complies with the rules and policies. Additionally, it can include specific values for computed metrics and/or an indication of which rules/policies are not complied with. The notification can be a text message, email, chat message, etc. By automatically providing the notification to a device of a user or data scientist associated with the model, the user or data scientist is able to correct or fix the model without having to wait for a human validator to review the model as in conventional development cycles.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, one or more functionalities of the system 100 can be implemented in a cloud computing environment. However, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
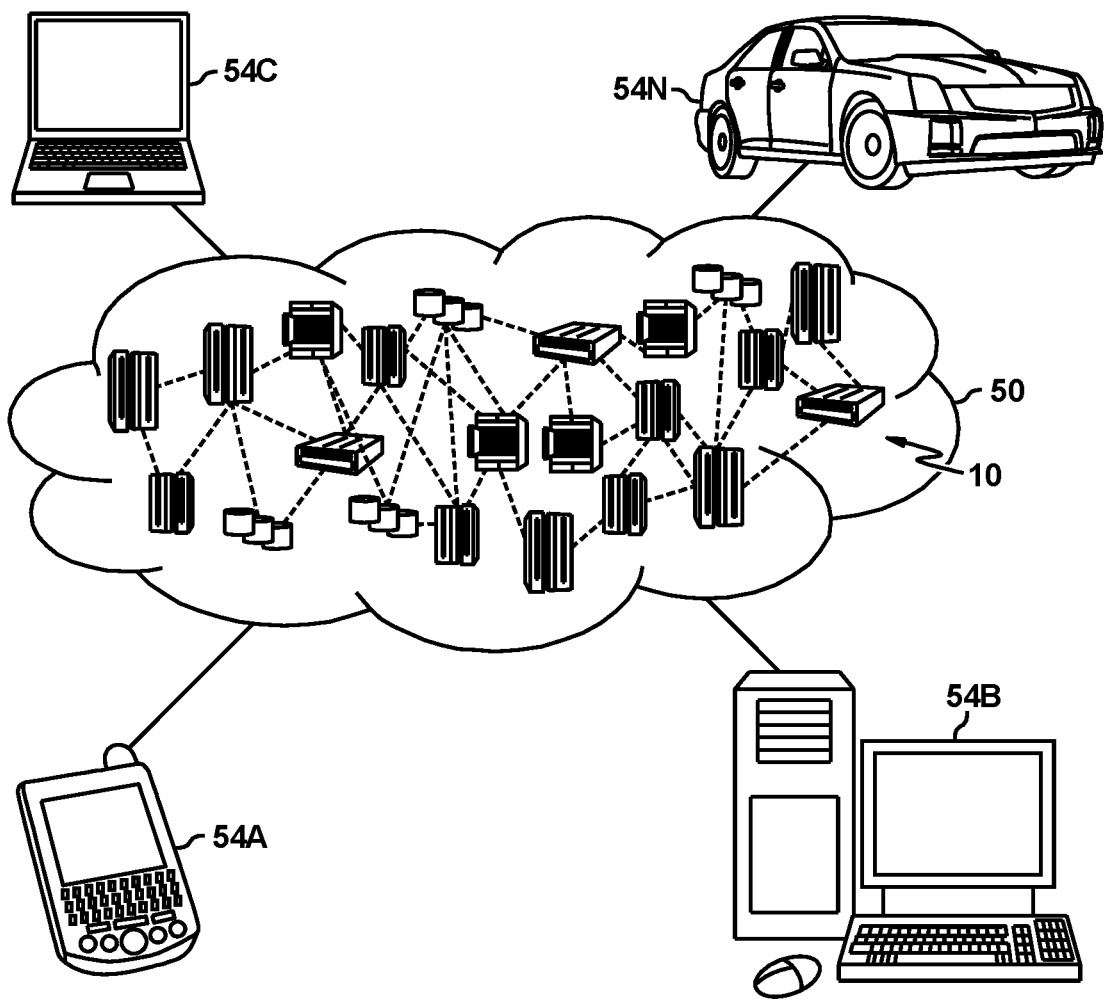
FIG. 4 depicts one embodiment of a cloud computing environment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer device 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
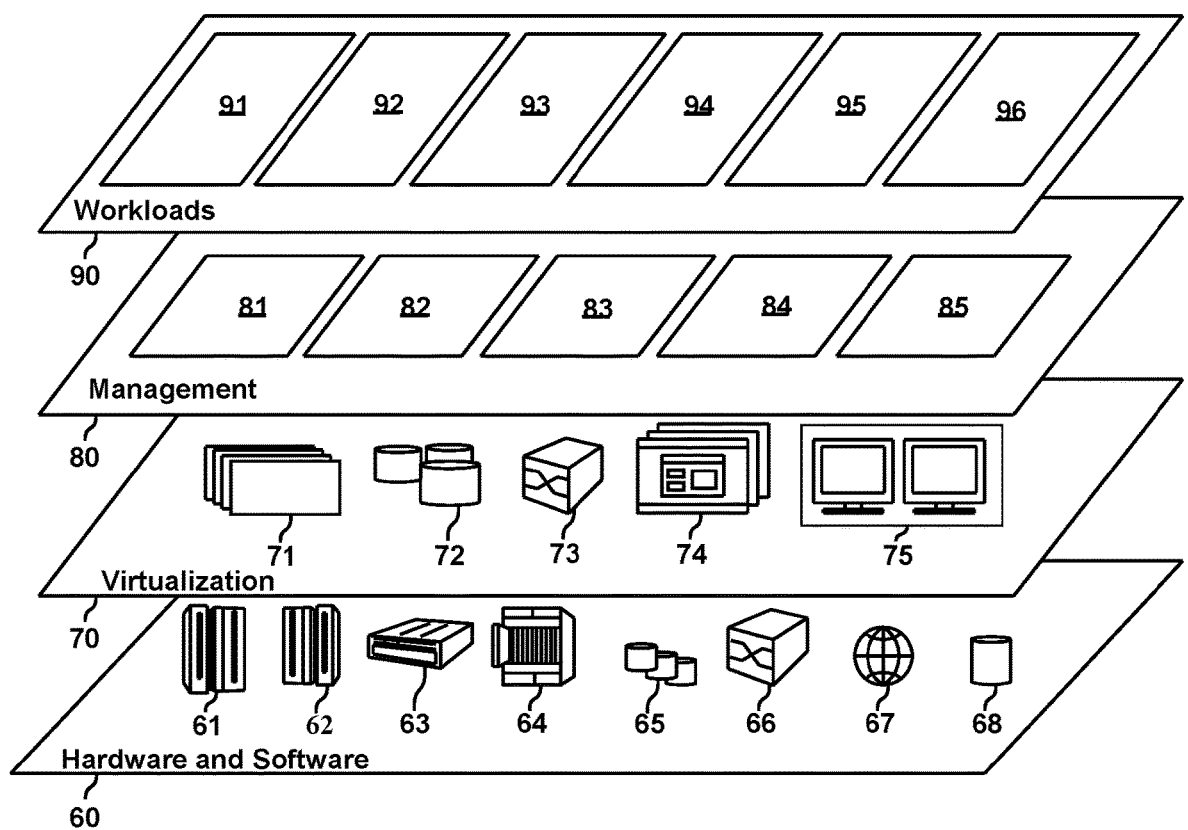
FIG. 5 depicts one embodiment of abstraction model layers.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic model validation 96.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
an interface;
a memory configured to store governance rules and policies; and
a processor communicatively coupled to the memory and to the interface, wherein the processor is configured to:
perform an identifying operation selected from the group consisting of:
a) identifying a model to be validated that is stored in a repository responsive to detecting that the model was pushed to the repository, and
b) identifying the model to be validated comprises:
detecting a change in the one or more encoded rules and policies; and
in response to detecting the change, identifying the model to be validated based on the model having not been validated subsequent to the detected change;
automatically compute and record one or more model metrics for the model to be validated in a tamper-proof manner;
compare the computed tamper-proof metrics with one or more encoded rules and policies to determine if the model to be validated complies with the one or more encoded rules and policies; and
output a notification to a device indicating a validation status of the model to be validated based on the comparison of the computed tamper-proof metrics with the one or more encoded rules and policies.

2. The system of claim 1, wherein identifying the model to be validated comprises:
receipt of instructions via an application programming interface (API) to initiate validation of the model.

3. The system of claim 1, wherein identifying the model to be validated comprises:
identification of the model to be validated in response to detecting that the model was pushed to the repository.

4. The system of claim 1, wherein identification of the model to be validated comprises configuring the processor to:
periodically initiate a validation check on the model.

5. The system of claim 1, wherein identifying the model to be validated comprises:
detection of a change in the one or more encoded rules and policies; and
in response to the detection of the change, identifying the model to be validated based on the model having not been validated subsequent to the detected change.

6. The system of claim 1, wherein automatically computing and recording one or more model metrics for the model in a tamper-proof manner comprises configuring the processor to:
register with the repository a service identification (ID) of a computation tool authorized to edit metadata of the model to be validated; and
prohibit edits to the metadata of the model to be validated that are not performed by the computation tool having the registered service ID.

7. The system of claim 1, wherein comparing the computed tamper-proof metrics with one or more encoded rules and policies to determine if the model complies with the one or more encoded rules and policies includes configuring the processor to:
identify training data specified in a label of the model to be validated that indicates the model to be validated was built with the training data;
retrieve the identified training data;
automatically build a sample model using the retrieved training data;
automatically compute one or more metrics for the sample model;
compare the one or more metrics for the sample model with the one or more for the model to be validated; and
verify whether the model to be validated was built using the identified training data based on the comparison.

8. A system comprising:
an interface;
a memory configured to store governance rules and policies; and
a processor communicatively coupled to the memory and to the interface, wherein the processor is configured to:
identify a model to be validated that is stored in a repository;
automatically compute and record one or more model metrics for the model to be validated in a tamper-proof manner;
compare the computed tamper-proof metrics with one or more encoded rules and policies to determine if the model to be validated complies with the one or more encoded rules and policies; and
output a notification to a device indicating a validation status of the model to be validated based on the comparison of the computed tamper-proof metrics with the one or more encoded rules and policies;
wherein the automatic computation and recordation of the one or more model metrics for the model in a tamper-proof manner comprises configuring the processor to:
register with the repository a service identification (ID) of a computation tool authorized to edit metadata of the model to be validated; and
prohibit edits to the metadata of the model to be validated that are not performed by the computation tool having the registered service ID.

9. The system of claim 8, wherein the identification of the model to be validated comprises configuring the processor to:
receive instructions via an application programming interface (API) to initiate validation of the model.

10. The system of claim 8, wherein identification of the model to be validated comprises configuring the processor to:
identify the model to be validated in response to the detection that the model was pushed to the repository.

11. The system of claim 8, wherein the identification of the model to be validated comprises configuring the processor to:
periodically initiate a validation check on the model.

12. The system of claim 8, wherein the identification of the model to be validated comprises configuring the processor to:
detect a change in the one or more encoded rules and policies; and
in response to the detection of the change, identify the model to be validated based on the model having not been validated subsequent to the detected change.

13. The system of claim 8, wherein the comparison of the computed tamper-proof metrics with one or more encoded rules and policies to determine if the model complies with the one or more encoded rules and policies includes configuring the processor to:
identify training data specified in a label of the model to be validated that indicates the model to be validated was built with the training data;
retrieve the identified training data;
automatically build a sample model using the retrieved training data;
automatically compute one or more metrics for the sample model;
compare the one or more metrics for the sample model with the one or more for the model to be validated; and
verify whether the model to be validated was built using the identified training data based on the comparison.

14. A system comprising:
an interface;
a memory configured to store governance rules and policies; and
a processor communicatively coupled to the memory and to the interface, wherein the processor is configured to:
identify a model to be validated that is stored in a repository;
automatically compute and record one or more model metrics for the model to be validated in a tamper-proof manner;
compare the computed tamper-proof metrics with one or more encoded rules and policies to determine if the model to be validated complies with the one or more encoded rules and policies; and
output a notification to a device indicating a validation status of the model to be validated based on the comparison of the computed tamper-proof metrics with the one or more encoded rules and policies;
wherein the comparison of the computed tamper-proof metrics with one or more encoded rules and policies to determine if the model complies with the one or more encoded rules and policies includes configuring the processor to:
identify training data specified in a label of the model to be validated that indicates the model to be validated was built with the training data;
retrieve the identified training data;
automatically build a sample model using the retrieved training data;
automatically compute one or more metrics for the sample model;
compare the one or more metrics for the sample model with the one or more for the model to be validated; and
verify whether the model to be validated was built using the identified training data based on the comparison.

15. The system of claim 14, wherein the identification of the model to be validated comprises configuring the processor to:
receive instructions via an application programming interface (API) to initiate validation of the model.

16. The system of claim 14, wherein the identification of the model to be validated comprises configuring the processor to:
identify the model to be validated in response to detecting that the model was pushed to the repository.

17. The system of claim 14, wherein the identification of the model to be validated comprises configuring the processor to:
periodically initiate a validation check on the model.

18. The system of claim 14, wherein the identification of the model to be validated comprises configuring the processor to:
detect a change in the one or more encoded rules and policies; and
in response to the detection of the change, identify the model to be validated based on the model having not been validated subsequent to the detected change.

19. The system of claim 14, wherein the automatic computation and recordation of the one or more model metrics for the model in a tamper-proof manner comprises configuring the processor to:
register with the repository a service identification (ID) of a computation tool authorized to edit metadata of the model to be validated; and
prohibit edits to the metadata of the model to be validated that are not performed by the computation tool having the registered service ID.

* * * * *